United States Patent [19]
Jonatzke

[11] Patent Number: 5,885,042
[45] Date of Patent: Mar. 23, 1999

[54] CONNECTION BETWEEN A METALLIC THREADED FASTENER AND A PART OF PLASTIC MATERIAL

[75] Inventor: Volker Jonatzke, Iserlohn, Germany

[73] Assignee: ITW-ATECO GmbH, Norderstedt, Germany

[21] Appl. No.: 980,284

[22] Filed: Nov. 28, 1997

[30] Foreign Application Priority Data

Dec. 12, 1996 [DE] Germany .......................... 196 51 628.5

[51] Int. Cl.⁶ .............................. F16B 25/00; F16B 39/02
[52] U.S. Cl. ............................................. 411/386; 411/301
[58] Field of Search .................................. 411/386, 387, 411/301–304

[56] References Cited

U.S. PATENT DOCUMENTS

| | | | |
|---|---|---|---|
| 447,775 | 3/1891 | Higbee | 411/386 |
| 2,908,309 | 10/1959 | Brill | 411/301 |
| 3,886,989 | 6/1975 | Strange | 411/303 |
| 4,750,851 | 6/1988 | Thomey | 411/301 |
| 5,073,073 | 12/1991 | Kazino et al. | |
| 5,320,467 | 6/1994 | Erdes | 411/386 |

FOREIGN PATENT DOCUMENTS

| | | | |
|---|---|---|---|
| 26 44 215 | 8/1983 | Germany . | |
| 31 09 686 | 2/1985 | Germany . | |
| 27 60 081 | 10/1986 | Germany . | |
| 87 08 281 U | 12/1987 | Germany . | |
| 323583 | 1/1930 | United Kingdom . | |
| 957572 | 5/1964 | United Kingdom | 411/301 |

Primary Examiner—Flemming Saether
Attorney, Agent, or Firm—Schwartz & Weinrieb

[57] ABSTRACT

A connection between a metallic threaded fastener having a threaded portion and a part of plastic material having a bore, the threaded portion forming or tapping a counter thread into the wall of the bore, characterized in that for a predetermined number of threads, the entrance portion of the bore is provided with a circular shaped or arc shaped inclined cam surface which encircles the bore helically and which forms a step between the ends of the cam surface or the associated ends of adjacent cam surfaces, respectively.

21 Claims, 1 Drawing Sheet

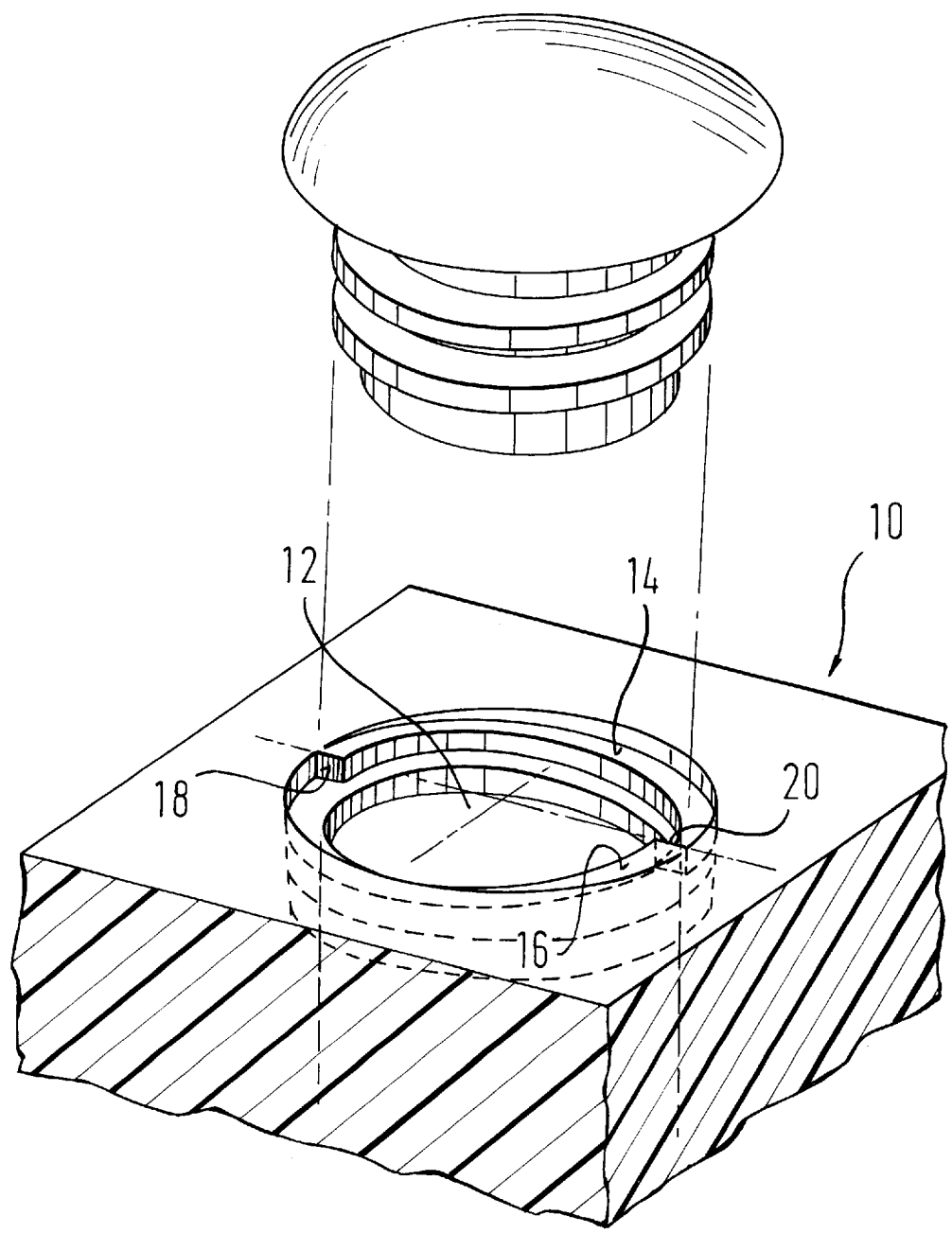

CONNECTION BETWEEN A METALLIC THREADED FASTENER AND A PART OF PLASTIC MATERIAL

FIELD OF THE INVENTION

The present invention relates generally to joint connections, and more particularly to a connection between a metallic threaded fastener and a part of plastic material.

BACKGROUND OF THE INVENTION

There are various types of connections or joints comprising a metallic screw or bolt to be screwed into a plastic part. The plastic part has a bore having a diameter which, for example, approximately similar to the pitch diameter of the screw threads. The screw threads of the screw or bolt are of such a structure that they form threads within the plastic part by displacing material or by a tapping or cutting operation.

Conventional connections or joints—no matter whether the screw threads are of the single, double or multiple thread type—suffer from the drawback that the screw when being positioned upon the plastic part is oriented obliquely to the axis of the bore corresponding to the pitch angle of the threads. It is difficult to screw or thread the bolt or screw into the bore under substantial axial pressure. Furthermore there is the risk that the screw or bolt will be screwed into the bore in an oblique manner when the axis of the screw or bolt is inclined with respect to the axis of the bore. Still further, when a screw or bolt is screwed into the bore again there will be the risk that it will form additional threads in the bore so as to weaken the connection or joint.

OBJECT OF THE INVENTION

It is a primary object of the invention to provide a connection between a metallic threaded fastener and a part of plastic material which does not suffer from the above drawbacks and which enables one to axially position the threaded fastener before it will form the threads.

SUMMARY OF THE INVENTION

In the connection of the present invention the entrance portion of the bore is provided with one circular or arc-shaped inclined cam surface for each thread, which cam surface encircles the bore helically while forming a step between the ends of the cam surfaces or between associated ends of adjacent cam surfaces, respectively. The slope of the cam surfaces is preferably similar to the pitch of the thread of the fastener.

If a fastener of the single thread type is used, the cam surface preferably extends about the bore for a full turn, that is, for 360°, a step being provided between the ends of the cam surface and the height of the step corresponding to the slope of the cam surface. If a fastener of, for example the double thread type is used, there will be a pair of cam surfaces of which each extends in the circumferential direction for 180°. The height of the steps between adjacent cam surfaces or cam portions then corresponds to one-half the pitch of the threads of the fastener.

The cam surfaces ensure that the fastener will always be oriented substantially coaxial to the bore so that it cannot be screwed in obliquely. A further advantage of the steps is that the threads of the fastener and the wall of the bore will engage each other very quickly. It will not be necessary to exert a substantial axial pressure upon the fastener.

It is possible to provide the cam surface directly in the outer surface of the workpiece into which the bore opens.

According to a further aspect of the invention the cam surface is formed in a bore portion at the entrance portion having a larger diameter than the remainder of the bore. Preferably the cam surface is formed in a countersunk portion of the bore.

BRIEF DESCRIPTION OF THE DRAWINGS

The invention will be explained in more detail by means of the following detailed description when considered with reference to the accompanying drawing in which:

The sole FIGURE is a prespective view which shows schematically a plastic part having a bore according to the present invention.

DETAILED DESCRIPTION OF THE PREFERRED EMBODIMENT

In the drawing a plastic part such as a fastening element for a wide variety of uses is shown at 10. It has a bore 12 into which a not-shown metallic threaded fastener is to be screwed in or threadedly engaged. As may be seen a pair of cam surfaces or ramp surfaces 14, 16 are formed at the upper end of the bore 12 and are disposed substantially transversly with respect to the axis of the bore 12. Each cam surface 14, 16 extends for an angle of 180° and has a slope which is similar to the pitch of the fastener threads. The fastener threads are of the double thread type. The cam surfaces 14, 16 which are of helical shape form in their transition areas steps 18 and 20 the height of which is similar to one-half the pitch of the fastener threads. When the fastener has the tip of its shank inserted into the bore 12, the fastener threads will contact the cam surfaces 14, 16 at a location which is closely adjacent the tip of the fastener shank. As a result the fastener will be axially oriented such that the axes of the fastener and the bore will substantially coincide. This will avoid the risk of the fastener being screwed into the bore 12 in an oblique manner. A further advantage is that when the fastener is again screwed into the bore 12 the threads of the fastener will slide by means of the cam surfaces 14, 16 into the same threads of the bore 12 as during the first assembly.

It should be understood that only a single cam surface will be provided in connection with threads of the single thread type, and three cam surfaces will be provided in the case of threads of the three thread type.

Obviously, many modifications and variations of the present invention are possible in light of the above teachings. It is therefore to be understood that within the scope of the appended claims, the present invention may be practiced otherwise than as specifically described herein.

I claim:

1. A connection between a metallic threaded fastener having a threaded shank portion which includes a tip portion and a longitudinal axis, and a part of plastic material having an outer surface, an unthreaded bore extending from said outer surface of said plastic material part and into an interior portion of said plastic material part, wherein said unthreaded bore defines a longitudinal axis and comprises an entrance portion defined within said outer surface of said plastic material part and leading into said unthreaded bore, and wherein said threaded shank portion of said metallic threaded fastener will form a corresponding thread into a wall portion of said plastic material part which defines said unthreaded bore within said plastic material part as said metallic threaded fastener is threadedly engaged within said unthreaded bore of said plastic material part, comprising:

circular shaped cam surface means for supporting said tip portion of said threaded shank portion of said threaded fastener prior to said threaded engagement of said threaded shank portion with said unthreaded bore of said plastic material part and the formation of said corresponding thread within said wall portion of said unthreaded bore of said plastic material part such that said threaded fastener is properly oriented with respect to said unthreaded bore defined within said plastic material part whereby said longitudinal axes of said threaded fastener and said unthreaded bore of said plastic material part will be substantially aligned with respect to each other so that said corresponding thread will be properly formed within said wall portion of said unthreaded bore of said plastic material part, said circular shaped cam surface means comprising step means disposed perpendicular to said outer surface of said plastic material part wherein an upper end of said step means is substantially coplanar with said outer surface of said plastic material part and said entrance portion of said unthreaded bore of said plastic material part, while a lower end of said step means is disposed axially inwardly from said outer surface of said plastic material part, and ramp surface means which encircles said entrance portion of said unthreaded bore of said plastic material part and which is inclined with respect to said longitudinal axis of said unthreaded bore such that said ramp surface means extends about said entrance portion of said unthreaded bore in a substantially helical manner from said lower end of said step means up to and substantially coplanar with said outer surface of said plastic material part and said entrance portion of said unthreaded bore of said plastic material part.

2. The connection of claim 1, wherein:

said inclined ramp surface means has a slope which corresponds to the pitch of said thread.

3. The connection of claim 1, wherein:

said ramp surface means is formed as a countersunk portion of said bore of said plastic material part.

4. The connection as set forth in claim 1, wherein:

said entrance portion of said bore of said plastic material part has a larger diametrical extent than the diametrical extent of said bore of said plastic material part.

5. The connection as set forth in claim 1, wherein:

said ramp surface means comprises a plurality of ramp surfaces serially disposed about said bore defined within said plastic material part; and said step means is formed between successive end portions of said plurality of ramp surfaces.

6. The connection as set forth in claim 5, wherein:

the number of ramp surfaces comprising said ramp surface means is a function of the number of threads of said threaded fastener.

7. The connection as set forth in claim 6, wherein:

said number of ramp surfaces comprises two ramp surfaces wherein each ramp surface comprises an arcuate extent of 180°; and said step means comprises a pair of steps are respectively provided between opposite ends of said two ramp surfaces.

8. A connection between a metallic threaded fastener having a threaded shank portion which includes a tip portion and a longitudinal axis, and a part of plastic material having an outer surface, an unthreaded bore extending from said outer surface of said plastic material part and into an interior portion of said plastic material part, wherein said unthreaded bore defines a longitudinal axis and comprises an entrance portion defined within said outer surface of said plastic material part and leading into said unthreaded bore, and wherein said threaded shank portion of said metallic threaded fastener will form a corresponding thread into a wall portion of said plastic material part which defines said unthreaded bore within said plastic material part as said metallic threaded fastener is threadedly engaged within said unthreaded bore of said plastic material part, comprising:

at least one circular shaped cam surface means for engaging said tip portion of said threaded shank portion of said threaded fastener prior to said threaded engagement of said threaded shank portion with said unthreaded bore of said plastic material part and the formation of said corresponding thread within said wall portion of said unthreaded bore of said plastic material part such that said threaded fastener is properly supported and oriented with respect to said unthreaded bore defined within said plastic material part whereby said longitudinal axes of said threaded fastener and said unthreaded bore of said plastic material part will be substantially aligned with respect to each other so that said corresponding thread will be properly formed within said wall portion of said unthreaded bore of said plastic material part, said at least one circular shaped cam surface means comprising at least one step means disposed perpendicular to said outer surface of said plastic material part wherein an upper end of said at least one step means is substantially coplanar with said outer surface of said plastic material part and said entrance portion of said unthreaded bore of said plastic material part, while a lower end of said at least one step means is disposed axially inwardly from said outer surface of said plastic material part, and at least one ramp surface means which encircles said entrance portion of said unthreaded bore of said plastic material part and which is inclined with respect to said longitudinal axis of said unthreaded bore such that said at least one ramp surface means extends about said entrance portion of said unthreaded bore in a substantially helical manner from said lower end of said at least one step means up to and substantially coplanar with said outer surface of said plastic material part and said entrance portion of said unthreaded bore of said plastic material part.

9. The connection as set forth in claim 8, wherein:

said at least one inclined ramp surface means has a slope which corresponds to the pitch of said thread of said threaded fastener.

10. The connection as set forth in claim 8, wherein:

said at least one ramp surface means is formed within a countersunk portion of said bore of said plastic material part.

11. The connection as set forth in claim 9, wherein:

said entrance portion of said bore of said plastic material part has a larger diametrical extent than the diametrical extent of said bore of said plastic material part.

12. The connection as set forth in claim 8, wherein:

said at least one ramp surface means comprises a plurality of ramp surfaces serially disposed about said bore defined as said plastic material part; and said at least one step means is formed between successive end portions of said plurality of ramp surfaces.

13. The connection as set forth in claim 12, wherein:

the number of ramp surfaces is a function of the number of threads of said threaded fastener.

14. The connection as set forth in claim 13, wherein:

said number of ramp surfaces comprises two ramp surfaces wherein each ramp surface comprises an arcuate extent of 180°; and said at least one step means comprises a pair of steps are respectively provided between opposite ends of said two ramp surfaces.

15. A plastic material part for connection with a metallic threaded fastener having a threaded shank portion which includes a tip portion and a longitudinal axis, wherein said plastic material part has an outer surface, an unthreaded bore extending from said outer surface of said plastic material part and into an interior portion of said plastic material part, wherein said unthreaded bore defines a longitudinal axis and comprises an entrance portion defined within said outer surface of said plastic material part and leading into said unthreaded bore, and wherein said threaded shank portion of said metallic threaded fastener will form a corresponding thread into a wall portion of said plastic material part which defines said unthreaded bore within said plastic material part as said metallic threaded fastener is threadedly engaged within said unthreaded bore of said plastic material part, comprising:

at least one circular shaped cam surface means for engaging said tip portion of said threaded shank portion of said threaded fastener prior to said threaded engagement of said threaded shank portion with said unthreaded bore of said plastic material part and the formation of said corresponding thread within said wall portion of said unthreaded bore of said plastic material part such that said threaded fastener is properly supported and oriented with respect to said unthreaded bore defined within said plastic material part whereby said longitudinal axes of said threaded fastener and said unthreaded bore of said plastic material part will be substantially aligned with respect to each other so that said corresponding thread will be properly formed within said wall portion of said unthreaded bore of said plastic material part, said at least one circular shaped cam surface means comprising at least one step means disposed perpendicular to said outer surface of said plastic material part wherein an upper end of said at least one step means is substantially coplanar with said outer surface of said plastic material part and said entrance portion of said unthreaded bore of said plastic material part, while a lower end of said at least one step means is disposed axially inwardly from said outer surface of said plastic material part, and at least one ramp surface means which encircles said entrance portion of said unthreaded bore of said plastic material part and which is inclined with respect to said longitudinal axis of said unthreaded bore such that said at least one ramp surface means extends about said entrance portion of said unthreaded bore in a substantially helical manner from said lower end of said at least one step means up to and substantially coplanar with said outer surface of said plastic material part and said entrance portion of said unthreaded bore of said plastic material part.

16. The plastic material part as set forth in claim 15, wherein:

said at least one inclined ramp surface means has a slope which corresponds to the pitch of said thread of said threaded fastener.

17. The plastic material part as set forth in claim 15, wherein:

said at least one ramp surface means is formed as a countersunk portion of said bore of said plastic material part.

18. The plastic material part as set forth in claim 15, wherein:

said entrance portion of said bore of said plastic material part has a larger diametrical extent than the diametrical extent of said bore of said plastic material part.

19. The plastic material part as set forth in claim 15, wherein:

said at least one ramp surface means comprises a plurality of ramp surfaces serially disposed about said bore defined within said plastic material part; and said at least one step means is formed between successive end portions of said plurality of ramp surfaces.

20. The plastic material part as set forth in claim 19, wherein:

the number of ramp surfaces is a function of the number of threads of said threaded fastener.

21. The plastic material part as set forth in claim 20, wherein:

said number of ramp surfaces comprises two ramp surfaces wherein each ramp surface comprises an arcuate extent of 180°; and said at least one step means comprises a pair of steps are respectively provided between opposite ends of said two ramp surfaces.

* * * * *